Patented Sept. 22, 1936

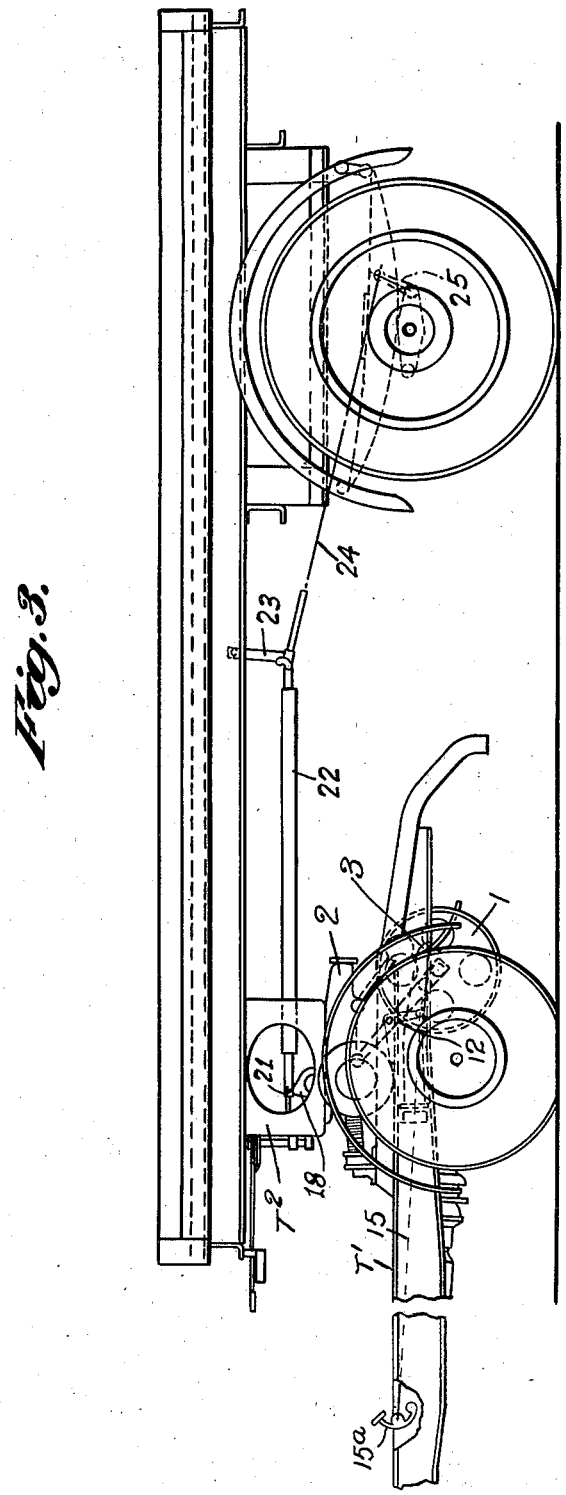

2,055,109

UNITED STATES PATENT OFFICE 2,055,109

BRAKE OPERATING MECHANISM FOR TRAILERS OF MOTOR VEHICLES

Oliver Danson North and Percy Garibaldi Hugh, London, England, assignors to Scammell Lorries Limited, London, England Application November 7, 1933, Serial No. 696,937 In Great Britain March 31, 1933

4 Claims. (Cl. 188—3)

This invention relates to brake operating mechanism for trailers of motor vehicles and has for its object to provide a simple means for operating the brakes of the trailer from the driving compartment of the tractor in such a manner that the brakes will not be affected by the relative movement between the two parts of the vehicle and which does not require to be connected or disconnected when the tractor and trailer are coupled and uncoupled. The arrangement also avoids the necessity for adjusting the brakes each time a tractor and trailer are coupled together. The invention is particularly applicable to tractor and trailer units which are adapted to be coupled automatically by simply backing the tractor into engagement with coupling means at the front of the trailer and which may be uncoupled by releasing suitable locking means and simply driving the tractor away.

Broadly the present invention is characterized by a slidable member carried by the trailer and mounted to reciprocate along the axis of articulation of the trailer relatively to the tractor, and an operating member carried relatively movably by the tractor and located thereon so that it is brought into operative engagement with said reciprocating member when the tractor and trailer are coupled, the said reciprocating member being connected to and actuating the braking means of the trailer, and the said operating member being controllable from the driver's seat or other convenient part of the tractor.

In one form of our invention a slidable member is mounted in a central aperture of the fixed portion of a turntable of the trailer and a portion of the slidable member projects downwardly so as to engage with one end of a lever on the tractor. This lever is suitably connected to a brake lever, pedal or operating gear under the control of the driver. The upper end of the slidable member co-operates with brake actuating mechanism on the trailer which is in turn connected to the trailer brakes. The invention may be applied to vehicles provided with coupling means according to our co-pending patent applications Nos. 696,938 and 696,939.

In order that our invention may be clearly understood and readily carried into effect we have appended hereto two sheets of drawings illustrating an embodiment thereof and wherein:—

Figure 1:
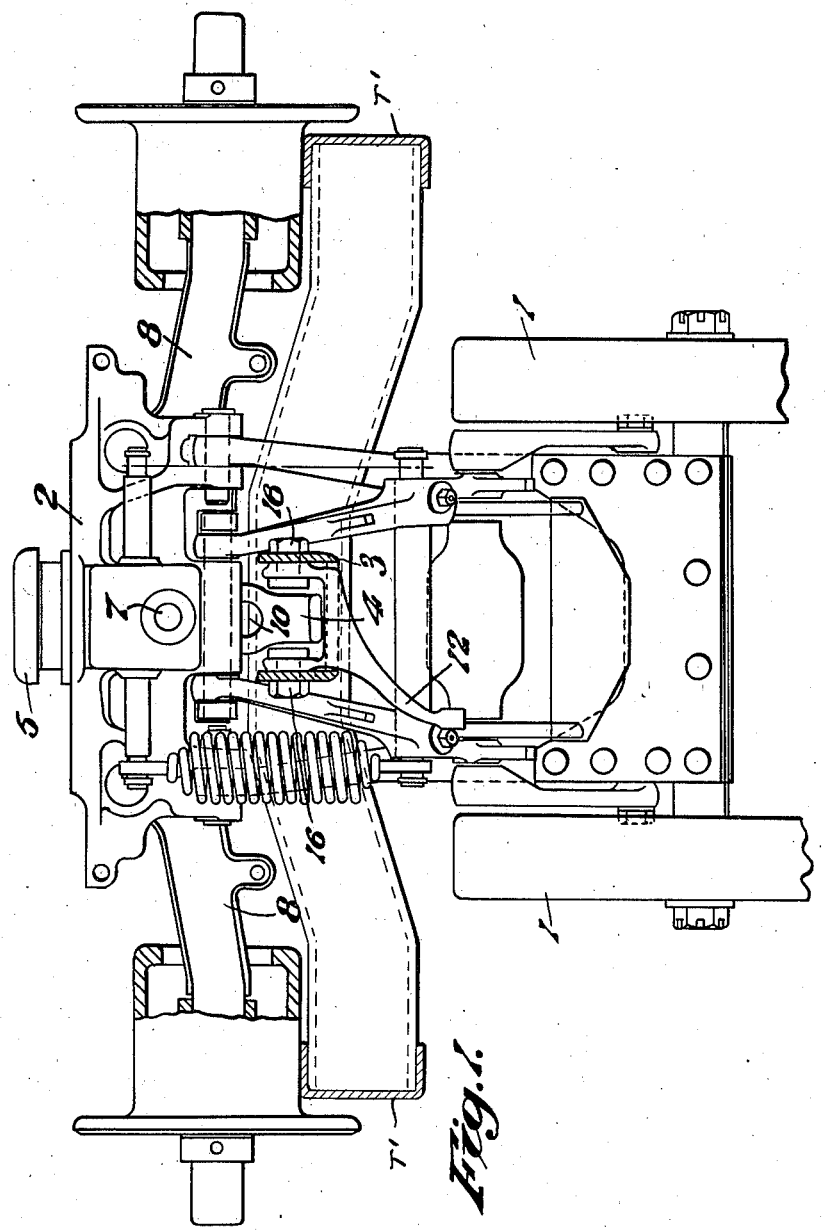
Figure 2:
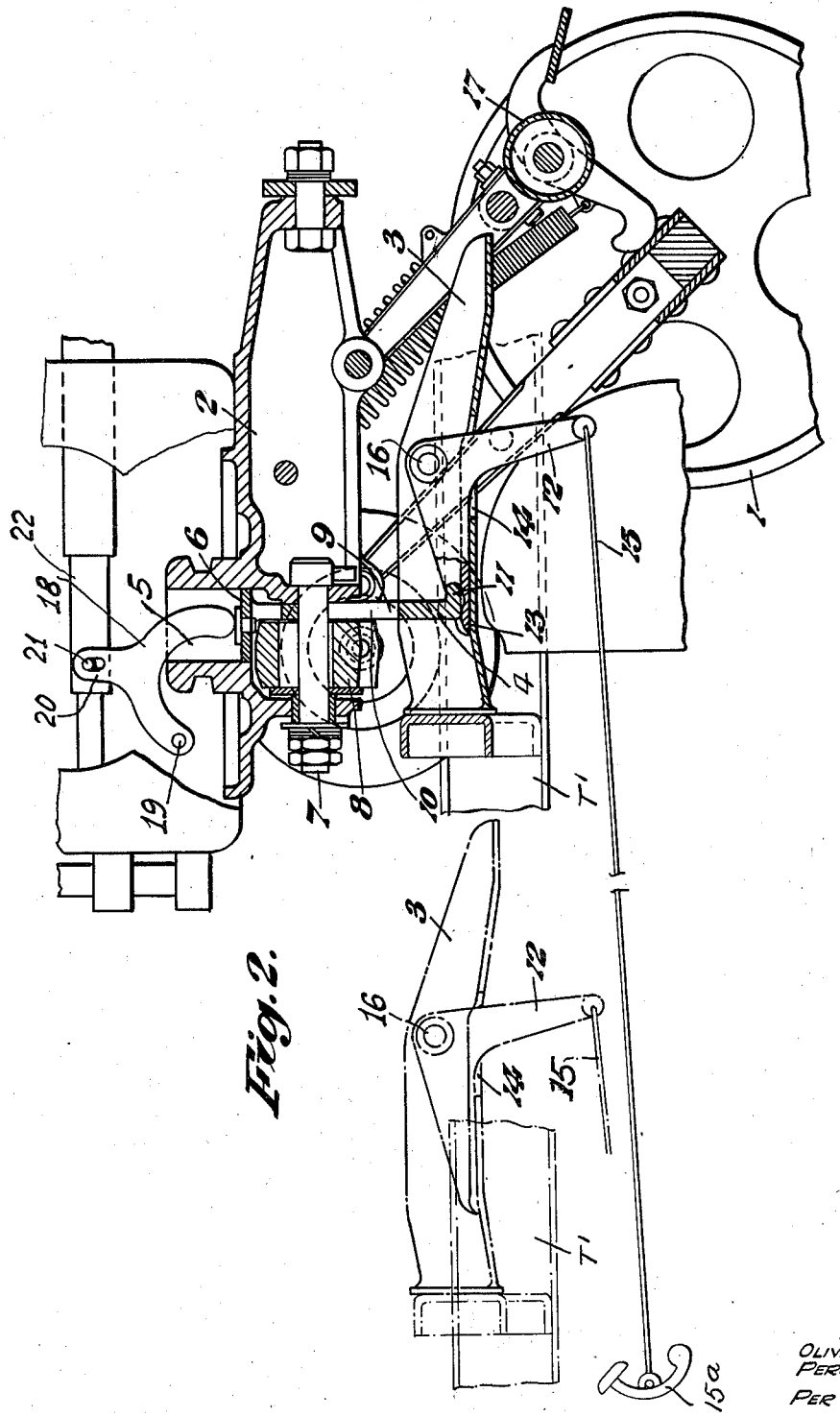

Fig. 1 is a rear elevation view of the brake coupling mechanism showing the front wheel structure of the trailer, Fig. 2 is a sectional side elevation view showing the brake operating lever of the tractor engaging the reciprocating brake actuating member of the trailer, and Fig. 3 is a side elevation of the tractor and trailer vehicles showing the brake coupling mechanism as applied thereto.

Referring to the drawings the rear part of the tractor is indicated at $T^1$ and the front part of the trailer at $T^2$. The trailer is provided with a pair of auxiliary wheels 1 connected in the manner described in our said co-pending patent application to a turntable base 2 of the trailer. Projecting from the rear of the tractor I' is a guide or ramp 3 which is a channel section bar adapted to slide under and receive the lower end of a vertical slidable brake operating member 4 which slides in a vertical axis hollow king pin 5 of the turntable base 2. This pin 5 forms the centre of articulation of the upper part of the turntable carried by the trailer.

The slidable brake operating member 4 is preferably formed with a cylindrical upper end 6 slidable in the said hollow pin 5. The turntable supports on a pivot bolt 7 a transverse beam 8 forming part of the vehicle coupling mechanism and the member 4 is shaped by being reduced in thickness to clear this beam. For this purpose the member 4 has a depending arm 9 integral with the upper part of the said member and slotted vertically as indicated at 10 to receive the bolt 7. The upper end 6 of the vertically slidable member 4 abuts against the free end of a lever 18 pivoted at 19 to the part $T^2$ of the trailer, this lever having a lug 20 having pin and slot connection 21 to a horizontally slidable brake operating rod 22 connected at its rear end to a depending pivoted arm 23 to which is also connected one end of a pair of brake rods 24 connected at their other ends to the levers 25 of the brakes of the trailer rear wheels.

The lower end of the arm 9 is bent or curved rearwardly as indicated by the reference numeral 11, such lower end having an arcuate or cam shaped lower face under which slides the guide or ramp 3.

The guide or ramp 3 carries a bell crank lever 12 the upper limb of which is of channel section and has its base lying against the base of the guide or ramp 3 and curved at its front edge as indicated at 13 to enable it to slide under the lower end of the vertically slidable member 4. In Fig. 2 it will be seen that the ramp member 3 when disconnected from the trailer as shown in broken lines, does not change its position relatively to the tractor.

The other limb of this lever depends through a slot 14 in the base of the guide or ramp 3 and receives a suitable cable 15 at its lower end connecting it to a brake lever pedal 15a or other actuating means on the tractor. The lever 12 is pivoted by a pair of pivot studs or bolts 16 passed through the corners of the two flanges or sides of the channel section upper limb of the lever so that there is no obstruction to the sliding of the lever under and in engagement with the member 4. As shown in Fig. 1 the depending limb of the lever 12 can be offset uni-laterally to clear the coupling mechanism and to bring it in line with the brake control levers of the tractor. This offsetting of the said limb is desirable when the said limb extends downwards in front of the roller 17 which as described in our said co-pending application is adapted to engage an abutment in the tractor.

We claim:—

1. In means for operating trailer brakes on articulated tractor and trailer-coupled vehicles, a vertically slidable trailer brake operating member carried by the trailer at its axis of articulation relatively to the tractor, a guide arm fixed relatively to the tractor projecting rigidly rearwardly therefrom and located so that it slides under and in engagement with the lower end of said relatively slidable member as the two vehicles are coupled, a trailer brake actuating device on the tractor, and a lever adapted to be operated from the said brake actuating device pivoted to said guide arm and formed with a part adapted to slide under and in engagement with the lower end of said slidable member when the two vehicles are fully coupled.

2. In means for operating trailer brakes on articulated tractor and trailer-coupled vehicles, a vertically slidable trailer brake operating member carried by the trailer at its axis of articulation relatively to the tractor, a guide arm fixed relatively to the tractor, projecting rigidly rearwardly therefrom and located so that it slides under and in engagement with the lower end of said vertically slidable member as the two vehicles are coupled, and a bell crank lever pivoted to said guide arm and having one limb abutting against the part of the said arm which slides against said vertically slidable member, the other limb depending below said arm, trailer brake actuating means on the tractor and means connecting said latter limb to said brake actuating means.

3. Means for operating trailer brakes on articulated tractor and trailer-coupled vehicles comprising a vertically slidable member for operating the brakes of the trailer and mounted to slide in the axis of articulation of the trailer, a substantially L shaped lever adapted to engage and push said vertically slidable member upwards, a substantially horizontally directed channel section guide arm carried by the tractor, said lever being pivoted adjacent its corner to and within said channel section guide arm and having one substantially horizontal limb located close to said guide and another limb depending from the guide, said substantially horizontal limb being adapted to be slid under and into engagement with the lower end of said slidable member, an aperture in the base of said channel section guide through which passes said depending limb of said lever, and brake operating means on the tractor connected to the said depending limb.

4. Means for operating trailer brakes on articulated tractor and trailer-coupled vehicles comprising a vertically slidable member for operating the brakes of the trailer and mounted to slide in the axis of articulation of the trailer, a substantially horizontally directed guide carried by the tractor, a substantially L shaped lever pivoted near its corner to said guide and having one limb of channel section located close to said guide and adapted to slide under and receiving the lower end of said vertically slidable member, and brake operating means on the tractor connected to said lever.

OLIVER DANSON NORTH.
PERCY GARIBALDI HUGH.